Patented Aug. 6, 1946

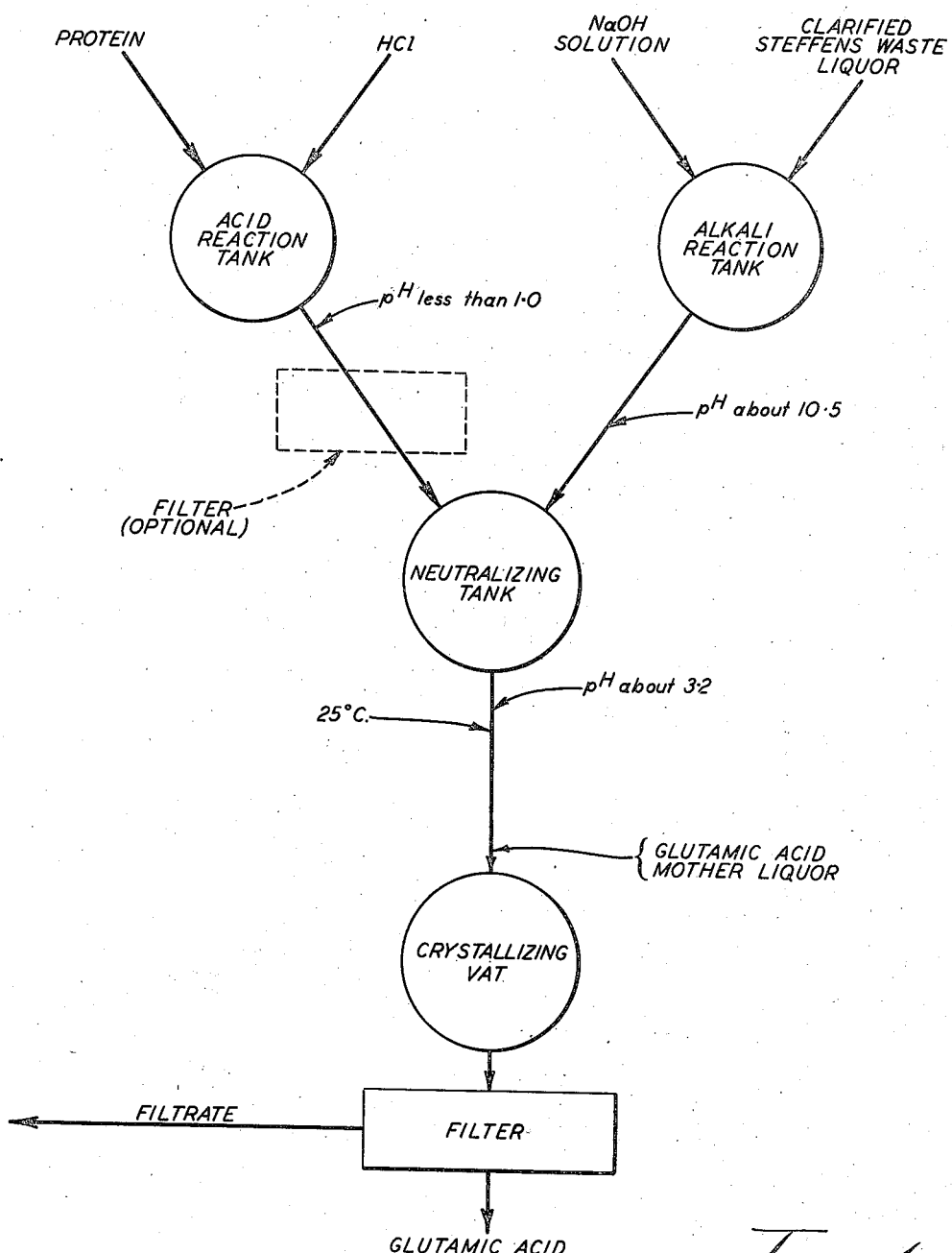

2,405,223

UNITED STATES PATENT OFFICE 2,405,223

HYDROLYSATE-NEUTRALIZATION PROCESS

Paul D. V. Manning, Glencoe, Ill., assignor to International Minerals & Chemical Corporation, a corporation of New York Application September 13, 1943, Serial No. 502,161

6 Claims. (Cl. 260—529)

My invention relates to improvements in the manufacture of amino acids and is of particular value in the production of amino acids from source materials such as wheat or other grains, and industrial wastes, for example, Steffen's waste, a by-product of the beet sugar industry.

D-glutamic acid (the dextro-rotatory species sometimes designated 1 (+) glutamic acid) is one amino acid which, or a salt of which, is at the present time very much in demand for the purpose of imparting a characteristic meat flavor to table products such as soups. In the production of this product two general methods are employed: First, there is the acid hydrolysis method, which is the one usually used in treating source materials such as wheat gluten or other grain proteins; and second, the alkali hydrolysis method which has been very successfully employed in the treatment of source materials such as Steffen's waste.

In the treatment steps which follow the hydrolysis step it is found desirable to arrive at a condition of neutrality, i. e., to end up with a solution the pH of which approximately corresponds with the iso-electric point of glutamic acid. This is in the neighborhood of 3.2 pH. To bring about this condition in the case of the acid hydrolysis method, it is necessary to add alkaline material to raise the pH from the highly acid condition resulting from the acid hydrolysis. In the case of the alkaline hydrolysis method, it is necessary to supply acid in order to lower the pH to a value of approximately 3.2.

I have discovered a way of combining certain steps of the two known methods above referred to so that various important advantages are obtained by the use of the combined method. For example, not only do I obtain a marked economy in the use of the reagents normally employed in the prior methods to obtain the desired condition of neutrality suitable for subsequent steps in the process, but there is also a considerable reduction in volume of materials to be handled or eliminated.

The invention will be described in its application to the production of the particular amino acid hereinbefore referred to, i. e., d-glutamic acid. The drawing accompanying this application illustrates diagrammatically the salient features of the new process.

In the particular example selected to illustrate the production of d-glutamic acid, the raw source materials may be wheat gluten for the acid hydrolysis, and Steffen's waste liquor for the alkaline hydrolysis.

The acid hydrolysis

The acid hydrolysis step is performed by mixing wheat gluten and strong hydrochloride acid in suitable proportions; for example, two parts of acid to one part of protein, and permitting the reaction to continue until the protein is substantially completely hydrolyzed. Ordinarily this will require a temperature of about 135° C. for one-half hour, the pressure equivalent being about 31 lbs. per square inch gauge pressure. However, it will be understood that the use of a lower temperature and pressure for a longer period will give equivalent results.

After the protein has been completely hydrolysed, it will usually be advisable to filter the batch at a temperature of about 80° C. or lower. This filtration step is indicated by dotted lines in the drawing. The cake from the filtrate is discarded and the filtrate is discharged into the neutralizing tank for the purpose of neutralizing the solution coming from the alkaline side of the process, now to be described.

The alkaline hydrolysis

According to well-known practices, the waste liquor coming from the Steffen's process (which is the final recovery step in a well-known process of manufacturing sugar from sugar beets) is first concentrated to a specific gravity of about 1.34 or higher, and if necessary filtered or clarified to remove undesirable solid materials. The clarified concentrated liquor is then carefully mixed with the required quantity of caustic soda, the mix having a final alkalinity (expressed as NaOH) of about 6% to 8%.

This mixture of Steffen's waste and caustic soda is then introduced into a hydrolyser which is a closed reaction tank fitted with a suitable agitator and a jacket or other means for heating by live steam. A temperature of from 80° to 100° C., preferably about 85° C., is maintained for a period of from 2 to 3 hours, and after the hydrolysis is complete the batch is cooled promptly by substituting cold water for the steam in the heating jacket. Optimum results have been obtained with heat treatment equivalent to about two and one-quarter hours at temperatures between 80° C. and 90° C. When the temperature has been lowered to a reasonable degree, for example, room temperature, the batch is discharged into the neutralizing tank. At this point the sodium hydroxide concentration will be about 8%.

Neutralizing

In the neutralizing tank the solution from the acid hydrolysis side (having a pH of less than 1.0) and the solution from the alkaline hydrolysis side are joined or brought together. The quantities of the respective solutions are adjusted so that the combined batches will have a pH in the neighborhood of 3.2, which is the iso-electric point of d-glutamic acid.

After the two batches of solution have neutralized each other, the liquid is cooled. If, within a short time after cooling, it is found that any inorganic solids have crystallized out, they can be removed by centrifuging.

The neutralized solution containing the glutamic acid is charged into large crystallizing vats, in which it is held for a considerable time, for example, about five to six days, at room temperature, at the expiration of which time it will be found that substantially all of the crude glutamic acid has crystallized out. The glutamic acid crystals in the form of slurry are then removed from the holding vats and put through a filter, the solids recovered being glutamic acid in a somewhat impure state. The filtrate is discarded or may be retreated in any suitable manner to recover any glutamic acid which may remain in the solution.

The crude or impure glutamic acid resulting from the above process may be refined or purified in accordance with any approved methods, and by treating with any desired base, the desired salt may be produced. Usually, it is found desirable to convert the acid to the mono-sodium salt of d-glutamic acid, by treating a repulped solution of the glutamic acid with sodium hydroxide.

In some cases it may be advisable to practice a slight variation of the process as above outlined; for example, instead of exactly balancing the required amounts of the acid and alkali hydrolysates so as to bring the pH of the combined batch to 3.2 in one step, it may be advisable to stop short of complete neutralization and subsequently add a sufficient amount of any desired acid or alkali, as the case may be, required to attain the required pH of about 3.2.

I claim:

1. The improved process of manufacturing d-glutamic acid, which comprises treating a supply of Steffen's waste with an alkali to effect hydrolysis of said waste material, but only to the extent necessary to produce d-glutamic acid, said alkali being present in operative concentration, and up to about 8% at the end of the hydrolysis, treating a supply of grain protein with an acid to effect hydrolysis of the protein, then combining together the hydrolysates resulting from said treatments so as to produce a solution of the combined hydrolysates having a pH approximately the same as the iso-electric point of d-glutamic acid and then subjecting the combined hydrolysate solution to suitable treatment so as to separate therefrom the desired d-glutamic acid.

2. The improvement in the art of making d-glutamic acid which comprises: (1) hydrolysing a protein with a strong mineral acid to produce d-glutamic acid; (2) reacting concentrated Steffen's waste liquor with an aqueous caustic soda solution for a time and at a temperature equivalent to about two and one-quarter hours at 80° C. to 90° C. so as to substantially completely hydrolyse said material and form unracemized d-glutamic acid; (3) combining with the alkaline solution resulting from step 2, sufficient acidic material to reduce the pH of said alkaline solution to about the iso-electric point of d-glutamic acid, said acidic material including a major fraction of solution derived from step 1; (4) then holding the solution at room temperature for an extended period until its d-glutamic acid content has become crystallized; and (5) then separating the crystals of d-glutamic acid from the liquor.

3. The improvement in the art of making d-glutamic acid which comprises: (1) reacting a grain protein with strong hydrochloric acid for a time and at a temperature equivalent to about ½ hour at 135° C. so as to substantially and completely hydrolyse the protein and produce a solution of d-glutamic acid; (2) separating the resulting solution from any solid material contained therein; (3) reacting concentrated Steffen's waste liquor with an aqueous caustic soda solution for a time and at a temperature equivalent to about 2¼ hours at 80° C. to 90° C. with a caustic soda content of about 8% so as to substantially completely hydrolyse said material without racemizing the glutamic acid; (4) combining with the alkaline solution resulting from step 3 sufficient acidic material to reduce the pH of said alkaline solution to about the iso-electric point of d-glutamic acid, said acidic material including a substantial amount of solution derived from step 2; (5) then holding the solution at room temperature for some days until its d-glutamic acid content has become crystallized; and (6) then separating the crystals of d-glutamic acid from the liquor.

4. The improvement in the art of making d-glutamic acid which comprises: (1) reacting a grain protein with strong hydrochloric acid to substantially and completely hydrolyse the protein and produce a solution of d-glutamic acid; (2) separating the resulting solution from any solid material contained therein; (3) reacting concentrated Steffen's waste liquor with an aqueous caustic soda solution at a temperature not exceeding about 90° C., and with caustic content not exceeding about 8% so as to substantially completely hydrolyse said material without racemizing the glutamic acid; (4) combining with the alkaline solution resulting from step 3 sufficient acidic material to reduce the pH of said alkaline solution to about the iso-electric point of d-glutamic acid, said acidic material including a major fraction of solution derived from steps 1 and 2; (5) then holding the solution at room temperature for some days until its d-glutamic acid content has become crystallized; and (6) then separating the crystals of d-glutamic acid from the liquor.

5. The improvement in the art of making d-glutamic acid which comprises: (1) hydrolysing a grain protein in strong hydrochloric acid for a time and at a temperature equivalent to about ½ hour at 135° C., so as to substantially completely hydrolyse the protein and produce a solution of d-glutamic acid; (2) separating the resulting solution from any solid material contained therein; (3) reacting concentrated Steffen's waste liquor with caustic soda solution of concentration not exceeding about 8% and at a temperature not exceeding about 90° C., so as to substantially completely hydrolyse said material without racemizing the glutamic acid content of said liquor; (4) combining the alkaline solution resulting from step 3 with the acid solution resulting from steps 1 and 2, in such proportions and temperature conditions as to secure a combined solution having a pH at about the iso-electric point of d-glutamic acid and a temperature about room temperature; (5) promptly separating an immediate precipitate of inorganic salt present in excess of saturation values; (6) thereafter holding said solution at the same temperature for some days while the unseparated inorganic salts remain dissolved and d-glutamic acid crystallizes; and (7) separating the crystals of d-glutamic acid from the liquor and the inorganic salts therein.

6. The improvement in the art of making d-glutamic acid which comprises: (1) reacting a grain protein in strong mineral acid, so as to substantially completely hydrolyse the protein and produce a solution of d-glutamic acid; (2) reacting concentrated Steffen's waste liquor with caustic soda solution of concentration not exceeding about 8% and at a temperature not exceeding about 90° C., so as to substantially completely hydrolyse said material without racemizing the glutamic acid content of said liquor; (3) combining the alkaline solution resulting from step 2 with the acid solution resulting from step 1, and with not more than a minor fraction of material to adjust the pH of the combined solution to about the iso-electric point of d-glutamic acid; (4) promptly separating any solid materials present; (5) holding said solution for some days without temperature change while the d-glutamic acid crystallizes; and (6) separating the crystals of d-glutamic acid from the liquor and the inorganic salts therein.

PAUL D. V. MANNING.